Dec. 13, 1966  J. A. DANIEL, JR  3,291,431

STRAIGHT LINE CARRIER DEVICE

Filed July 2, 1965  5 Sheets-Sheet 1

INVENTOR
James A. Daniel, Jr.

BY  Tourou and Broudy
ATTORNEY

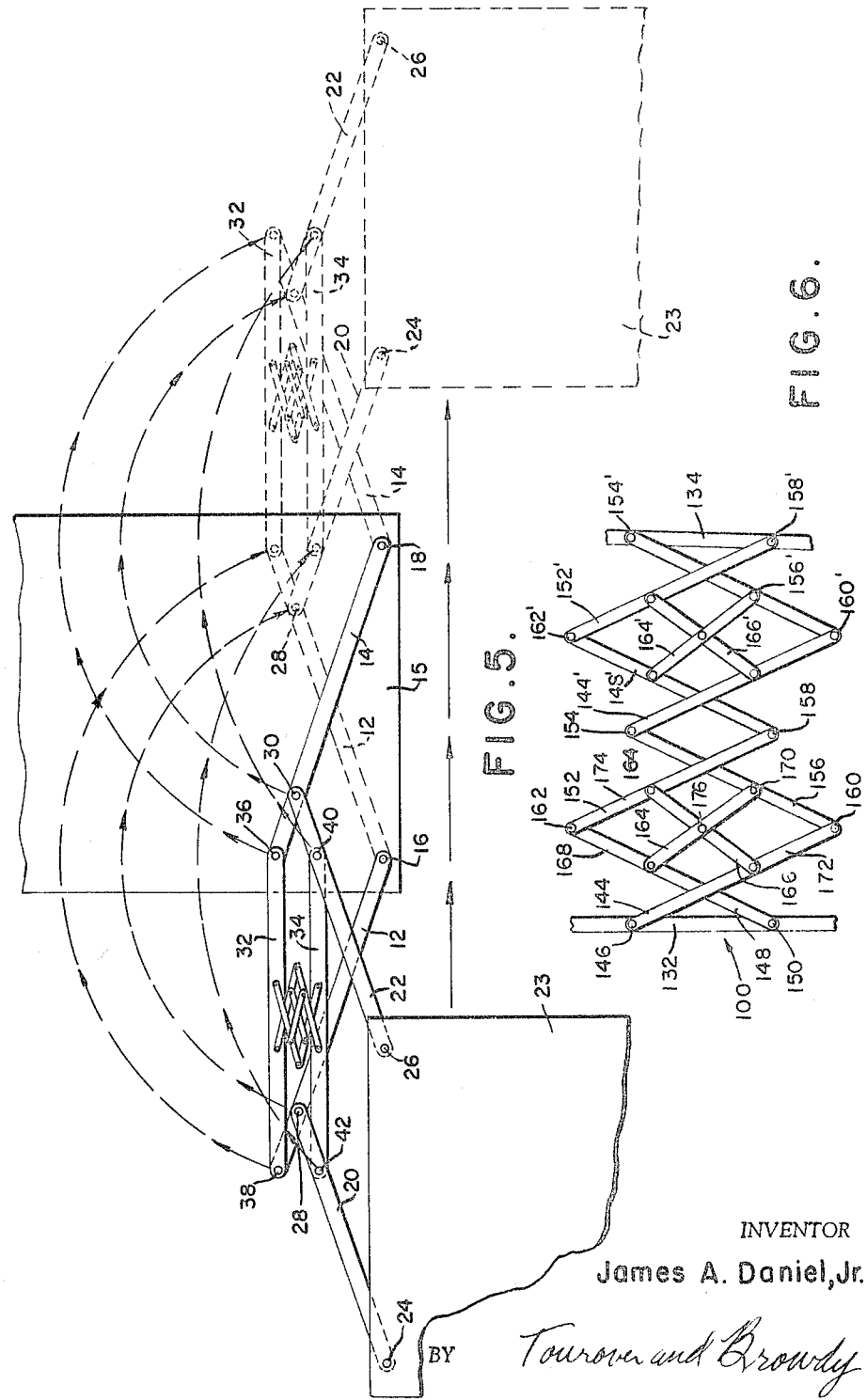

Dec. 13, 1966  J. A. DANIEL, JR  3,291,431
STRAIGHT LINE CARRIER DEVICE
Filed July 2, 1965  5 Sheets-Sheet 3

INVENTOR
James A. Daniel, Jr

BY  Tourover and Broudy

ATTORNEY

Dec. 13, 1966   J. A. DANIEL, JR   3,291,431
STRAIGHT LINE CARRIER DEVICE
Filed July 2, 1965   5 Sheets-Sheet 5

INVENTOR
James A. Daniel, Jr.

BY Tourover and Browdy
ATTORNEY

United States Patent Office 3,291,431
Patented Dec. 13, 1966

3,291,431
STRAIGHT LINE CARRIER DEVICE
James A. Daniel, Jr., R.D. 2, Box 66,
Newton, N.J. 07860
Filed July 2, 1965, Ser. No. 469,175
25 Claims. (Cl. 248—277)

The present invention relates to a straight line carrier device, and more particularly, a device for supporting a movable object in relation to a stationary object or another movable object, which objects can reciprocate in a straight line via the use of swinging parallelograms, wherein such supporting device does not utilize rollers or members sliding in relation to one another and whereas the device is not restricted to the length of its own dimension for length of carriage, i.e., it may expand and contract.

Straight line carriers and supporting devices in general are well known and serve a great variety of purposes. Thus, for example, pivoted crosses, e.g., "lazy-tong" devices, are linked together and used for a variety of purposes, such as the provision of expandable and contractable gates. Telescoping devices are often used to move one member towards and away from another, for example, moving the lens from the eye piece in a telescope. Rollers, roller bearings, or ball bearings are often used, sometimes in a track, to enable one member to slide with respect to another member, such as a desk drawer or a sliding door. Similarly, doors and drawers are often provided in a track and slide in direct contact with the track.

All of such conventional straight line carriers, however, suffer from defects which often cause breakage or jamming, and are subject to excessive friction. Thus a pivoted cross linkage device requires a pair of lost motion slots in both the support member and the movable member and these points often become loose and wear out much quicker than the remainder of the device due to excessive friction, and, in addition, are subject to fouling by foreign materials. Direct sliding fixtures, such as telescoping devices and sliding doors or drawers are limited in their length of movement to the invariable length of their support and are also subject to wear and fouling, as well as binding. Rollers and bearings are also subject to fouling, and, in addition, are generally relatively expensive.

It is therefore an object of the present invention to overcome the problems of the prior art, such as those indicated above.

It is another object of the present invention to provide a straight line carrier device which contains no sliding or rolling members.

It is another object of the present invention to provide a straight line carrier device which is moved solely through pivot points.

It is another object of the present invention to provide an apparatus which will move any object in a straight line towards and away from any base.

It is another object of the present invention to move one object from another in a straight line solely through the use of pivots and suitable linkages and without the necessity of providing slides and/or rollers.

It is another object of the present invention to move one object from another in a straight line for a greater distance than the dimension of the carrier device, i.e., to provide a carrier device which can expand and contract as it carries.

It is another object of the present invention to provide for two or more mounting points for objects.

It is another object to construct a device that requires no base or support other than the objects to be moved.

It is another object of the present invention to traverse one object in relation to another object or base in a straight line as one object is moved towards and away from the other object.

It is another object of the present invention to join two support structures with suitable pivots and to link to provide one expandable and contractable unit.

It is another object of the present invention to move an object in a straight line in relation to another object with the straight line carrier device operating from any position.

It is another object of the present invention to provide a simple-to-operate and highly effective apparatus for accomplishing the above objects, which apparatus is relatively inexpensive and simple to produce.

Other objects and the nature and advantages of the instant invention will be apparent from the following description and a description of an exemplary embodiment of the invention taken in conjunction with the accompanying drawings, wherein:

FIG. 5 is a front elevation view of the preferred embodiment of FIGS. 1–3, in operation;

FIG. 6 is a front elevation view of another embodiment, utilizing the features of FIG. 4;

Figure 1:
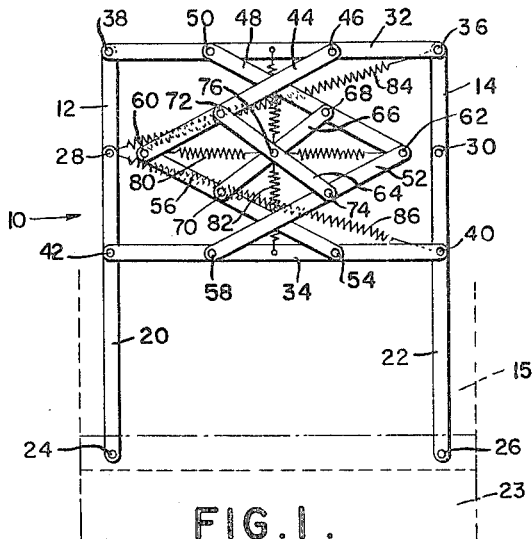
FIG. 1 is a front elevation view of a device in accordance with the present invention, embodying certain preferred features of the present invention.
Figure 2:
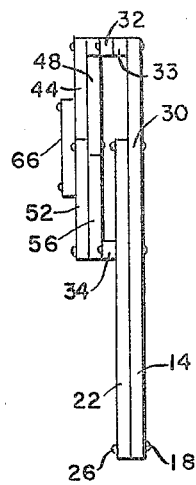
FIG. 2 is an end elevation view of the device in FIG. 1 with certain parts omitted.
Figure 3:
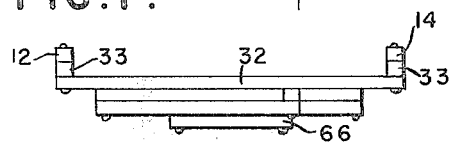
FIG. 3 is a plan view of the device of FIG. 2.

Noting FIGS. 1–3 and 5, a straight line carrier device 10 is shown comprising a first arm 12 and a second arm 14, both mounted on a base member 15 via pivots 16 and 18, respectively. Similarly, a third arm 20 and a fourth arm 22 are pivotally mounted to a movable member or traveller 23 via the pivot points 24 and 26, respectively. The distances between the pivots 24–28, 16–28, 26–30 and 18–30 are all equal.

The arm 20 is in turn pivotally mounted to the arm 12 at the pivot 28, and similarly the arm 14 is pivoted to the arm 22 at pivot 30. The pivots 16 and 18 of the arms 12 and 14, respectively, on the base 15 are spaced apart a distance equal to the spacing of the pivots 24 and 26 of the arms 20 and 22, respectively, on the traveller 23.

A pair of spacing rods 32 and 34 of length equal to the distance between the pivots 24 and 26 and the pivots 16 and 18 are provided between the arms 12 and 14 and the arms 20 and 22, respectively. The spacing rods 32 and 34 are parallel to each other and are located in the general vertical plane formed by the four arms. The spacing rod 32 is pivotally mounted on the arm 14 at a pivot 36 and on the arm 12 at a pivot 38. Similarly, the spacing rod 34 is mounted on the arm 22 at a pivot 40 and on the arm 20 at a pivot 42. The spacing rod 32 serves to maintain the arms 12 and 14 parallel to one another, while the spacing bar 34 serves to maintain the arms 20 and 22 parallel to one another. In order to maintain the spacing rods 32 and 34 in the same plane, it is generally advisable to provide spacers or thick washers 33 between the rod 32 and the arms 12 and 14 at the pivots 38 and 36, respectively.

In order to more fully understand the present invention, the arms 12, 14 and 20, 22 may be considered to be the sides of equal parallelograms, swinging, during movement of the carrier, in opposite directions. Thus, the arms 12 and 14 form the opposite sides of a first parallelogram having four corners defined by the pivots 16, 28, 30 and 18; and the arms 20 and 22 form opposite sides of a second parallelogram having four corners defined by the pivots 24, 28, 30 and 26. In the embodiment of FIGS. 1–3 and 5, the two parallelograms each have an imaginary side between the pivots 28 and 30 and this "side" is common to both parallelograms. By inspection of FIG. 5 it is seen that as the traveller 23 moves from left to right, the first parallelogram will rotate in a clockwise direction while the second parallelogram will rotate in a counterclockwise direction.

Figure 4:
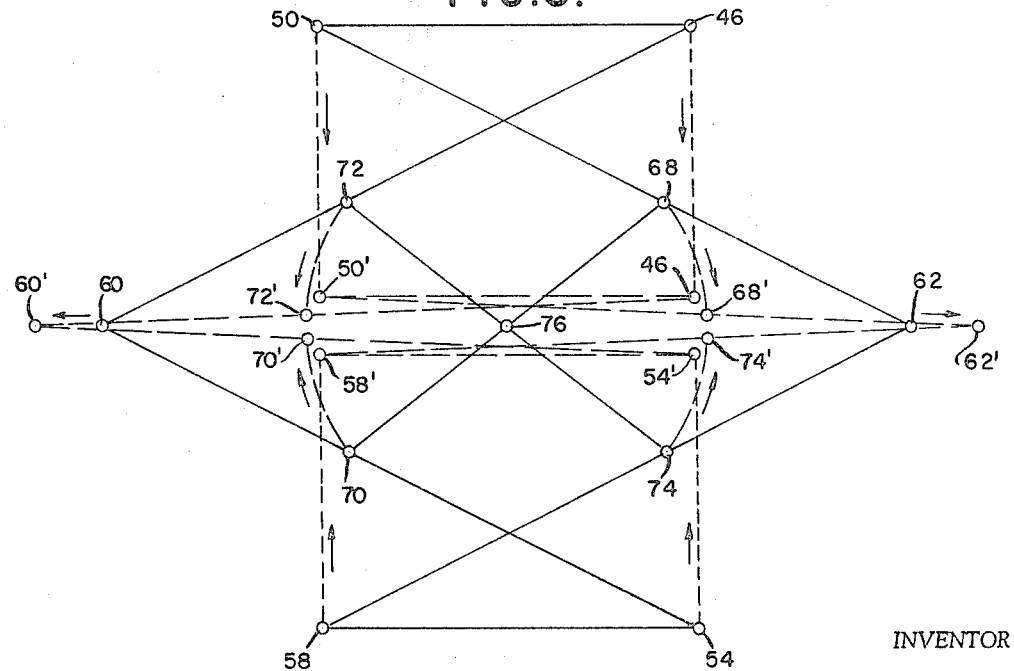
FIG. 4 is a schematic diagram illustrating certain movements of linkages illustrated in the preferred features of FIGS. 1–3.
Figure 7:
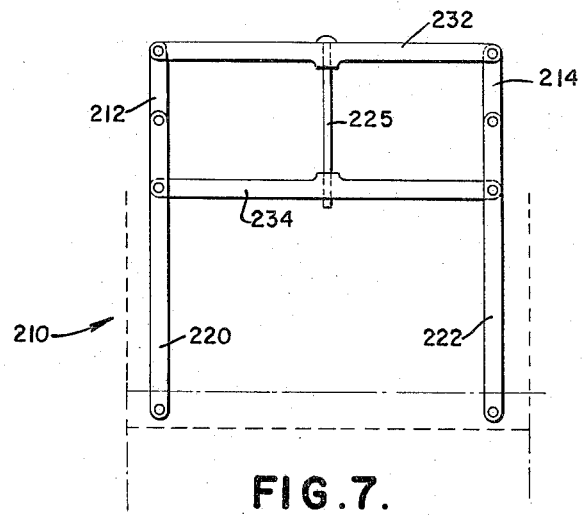
FIG. 7 is a front elevation view of another embodiment of the present invention.
Figure 8:
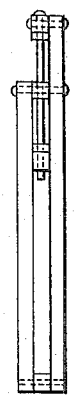
FIG. 8 is an end elevation view of the embodiment of FIG. 7.
Figure 9:
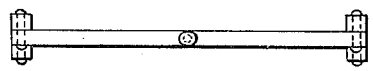
FIG. 9 is a plan view of the embodiment of FIG. 7.

The embodiment of FIGS. 7–10 (described below) shares the above-described structure with the embodiment of FIGS. 1–3 and 5, except for the requisite means to maintain the spacing rods in aligned relationship. In the preferred embodiments of FIGS. 1–3 and 5 (as well as the embodiment of FIG. 6) and as schematically illustrated in FIG. 4, the means to maintain the spacing rods in aligned relationship comprises a group of pivotally connected bars. The means to maintain the spacing rods in aligned relationship in both the embodiments of FIGS. 5 and 10 both serve to maintain the spacing rods coextensive.

A preferred means to maintain the rods 32 and 34 in aligned relationship, i.e., coextensive (shown in FIGS. 1–5), comprises a bar 44 pivotally mounted to the spacing rod 32 at a pivot 46. A second bar 48 is also pivotally mounted on the spacing rod 32 a distance from the pivot 46 at a pivot 50. The bars 44 and 48 are inclined in opposite directions and cross each other to form an X-shape. In the same manner that the bars 44 and 48 are pivotally attached to the rod 32, so are two bars 52 and 56 attached to the spacing rod 34 at the pivots 54 and 58, respectively, and the bars 52 and 56 form a mirror image of the bars 44 and 48. The bar 44 is pivotally connected to the bar 56 at a pivot 60 to tie the bars 44 and 56 together in a side-facing "V" shape between the spacing rods 32 and 34. Similarly, the bars 48 and 52 are connected by a pivot 62 which forms the vertex of a "V" which lies in an opposite direction and facing the "V" formed by the bars 44 and 56. The bars 56, 52, 48 and 44 are all of equal length between their pivots.

To secure the two parallel rods 32 and 34 which are separated on a plane in a manner to retain the vertices of the "V" angles in a horizontal line, it is found that by the use of two linkages or bars 44 and 56 of even length pivoted one to each rod in such a manner that the free ends will converge one to the other to form an angle and these converging ends are pivoted one to the other to form a vertex of the angle, this vertex when held in the exact center of the two parallel rods 32 and 34 will force the rods 32 and 34 to remain coextensive when the rods are moved towards each other. To hold the vertex of an angle in the exact center of the two parallel rods as the rods are moved towards and away from each other is the principle of this contracting and expanding unit used in this preferred system.

In order for the device to operate properly, it is desirable that the pivots 60 and 62 of the "means to maintain the first and second rods in aligned relationship" move only towards and away from each other and always lie in a line parallel to the rods 32 and 34. In order to accomplish this result, a number of possible linkage variations may be provided, but the most desirable are the two embodiments illustrated in FIGS. 1–6 and in FIG. 15, respectively. The linkage means of FIGS. 1–6 comprise a tying link 64 and a tying link 66, both of which are equal in length and pivotally mounted on each of two opposite bars. Thus the link 64 is pivotally mounted between bars 48 and 56 via a pivot 68 on the bar 48 and a pivot 70 on the bar 56; and the link 66 is pivotally mounted between the bars 44 and 52 via a pivot 72 on the bar 44 and a pivot 74 on the bar 52. In addition, it is desirable to provide a pivot 76 tying the centers of the two links 64 and 66.

The operation of the "means to maintain the rods 32 and 34 in aligned relationship" can be seen in FIG. 4 by reference to the pivot points and how they move during movement of the device as illustrated in FIG. 5.

Thus, the pivot points 46, 50, 60, 62, 58, 54, 72, 68, 70, 74, and 76 are all shown in solid lines in the position equivalent to the position of FIG. 1, or where the traveller 23 has moved one-half the distance between its original position illustrated in FIG. 5 (in solid lines) and its ultimate position illustrated in FIG. 5 (in phantom). On the other hand, the positions illustrated in phantom in FIG. 4 and delineated in primed numbers show the position of the same pivots (50′, 46′, 58′, 54′, 70′, 72′, 46′, and 54′) at the two extreme positions of the traveller 23, as illustrated in FIG. 5.

Thus, as the traveller 23 moves from its position in solid lines in FIG. 5 to its position shown in phantom in FIG. 5, the pivots 50′ and 46′ move upwardly to the positions 50 and 46 and then back down to the positions at 50′ and 46′; similarly, the pivots 58′ and 54′ move downwardly to the positions 58 and 54 and then back up to the position 58′ and 54′. Simultaneously therewith the pivots 60′ and 62′ approach each other to the positions 60 and 62 and then move away back to the positions 60′ and 62′. And, in the same sequence, the pivots 72′ and 68′ move upwardly in an arc while the pivots 70′ and 74′ move downwardly in an arc to the respective positions 72, 68, 70, and 74; and then move back to their original positions 72′, 68′, 70′, and 74′. Thus, it is seen that the spacing rods 32 and 34 move towards and away from each other as the device is expanded and contracted in a straight line. In addition, in the embodiments of FIGS. 1–5 and FIGS. 7–10, the spacing rods are prevented from sliding along their axes with respect to one another, i.e., they are retained in coextensive relationship.

Under certain conditions, and as illustrated in FIG. 1, it may be desirable to utilize springs in the device to bias one element towards another. Thus, when the straight line carrier device 10 is operating in an upright position, a spring 80 may be stretched between the pivots 60 and 62 to bias the device in the position shown in FIG. 1. A spring 82 mounted between the spacing rods 32 and 34 may be utilized when it is desired to bias the straight line carrier device 10 in a position upside down from that illustrated in solid lines in FIG. 5 (or in phantom lines in FIG. 5). Either one or a pair of springs 84 and 86 between the pivot point 28 and/or pivot points 36 and 40 (or, alternatively, between pivot 30 and/or pivots 42 and 38) may be used when the unit is in a vertical position and this will bias the device similar to the spring 82. The counterbalancing springs may be of importance when it is desired to maintain a device in one position or another.

Figure 15:
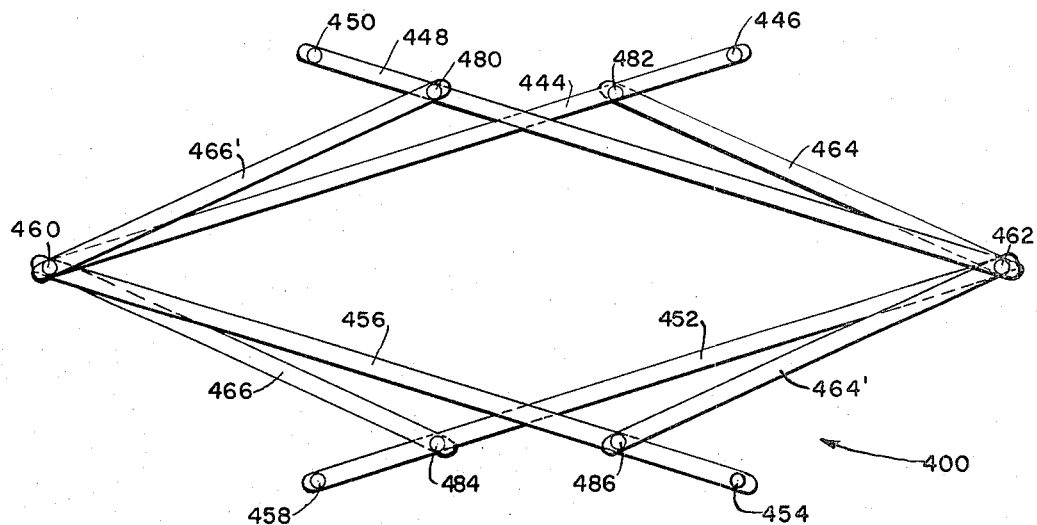
FIG. 15 is a front elevation view of a detail of another embodiment.

The embodiments of FIG. 6 and FIG. 15 are of particular use in place of "lazy-tong" straight line expanding and contracting devices. The device 100 of FIG. 6 essentially comprises a plurality of units, placed end-to-end, similar to that used in the embodiment of FIGS. 1–5 to maintain the rods 32 and 34 in aligned relationship. The device 200 of FIG. 15 may be used in the same manner.

The expansion device 100 comprises a base rod 132 and a traveller rod 134 which may move towards and away from the base rod 132 in a straight line. Between the base 132 and the traveller 134 may be provided a number of expansion units which will maintain these rods coextensive (if initially coextensive), i.e., in aligned relationship.

A bar 144 is connected to the base 132 via a pivot 146 and another bar 148 is connected to the base 132 at a pivot 150 and these bars 144 and 148 cross one another and are in turn pivotally connected to another set of bars 152 and 156 which also cross one another, bar 152 being pivotally connected to bar 148 at the pivot 162 and the bar 156 being connected to bar 144 at the pivot 160. Pivotally tying the bars 144, 148, 156, and 152 together are a pair of links 164 and 166, pivotally tied at their centers by a pivot 176. The link 164 is connected to the bar 148 at the pivot 168 and is connected to the bar 156 at the pivot 170. The link 166 is connected to the bar 152 at the pivot 174 and is connected to the bar 144 at the pivot 172. The bars 152 and 156 are connected at their extremities to another pair of bars 144' and 148', the bar 156 being connected to the bar 144' at a pivot 154, and the bar 152 being connected to the bar 148' at a pivot 158. The bar 148' is connected at a pivot point 162' to another bar 152' which in turn is connected to the traveller rods 134 at the pivot 158'. Similarly, the bar 144' is connected at a pivot 160' to another bar 156' which is connected to the traveller bar 134 at a pivot 154'. Connecting the bars 148' and 156' is a link 164', pivotally connected to each bar; similarly connecting the bar 144' and 152' is another link 166', pivotally connected to each bar.

It is, of course, clear from the illustrations and the descriptions of the above embodiments, that all the links, e.g. (164 and 166), are the same length, as are all the bars, e.g. (144, 148, 152 and 156).

As indicated above, the embodiment of FIGS. 7–10 is similar to the embodiment of FIGS. 1–5, except that a different means is provided to maintain the spacing rods coextensive. Thus, the expansion device 210 of FIGS. 7–10 comprises a base 215 and a traveller 223. Two arms 212 and 214 are pivotally attached to the base 215 and extend therefrom and are in turn pivotally connected to another pair of parallel arms 220 and 222 which are in turn pivotally connected to the traveller 223.

As in the embodiment of FIGS. 1–5, the expansion device 210 comprises a pair of spacing rods which are maintained in aligned relationship and are prevented from sliding longitudinally with respect to one another; the spacing rods 232 and 234 maintain the arms 212–214 and 220–222, respectively parallel. As the traveller moves from the position shown in solid lines in FIG. 10 to the position shown in phantom in FIG. 10, the spacing rods 232 and 234 will first move apart from one another to the position shown in FIG. 7 and then back towards one another.

Figure 10:
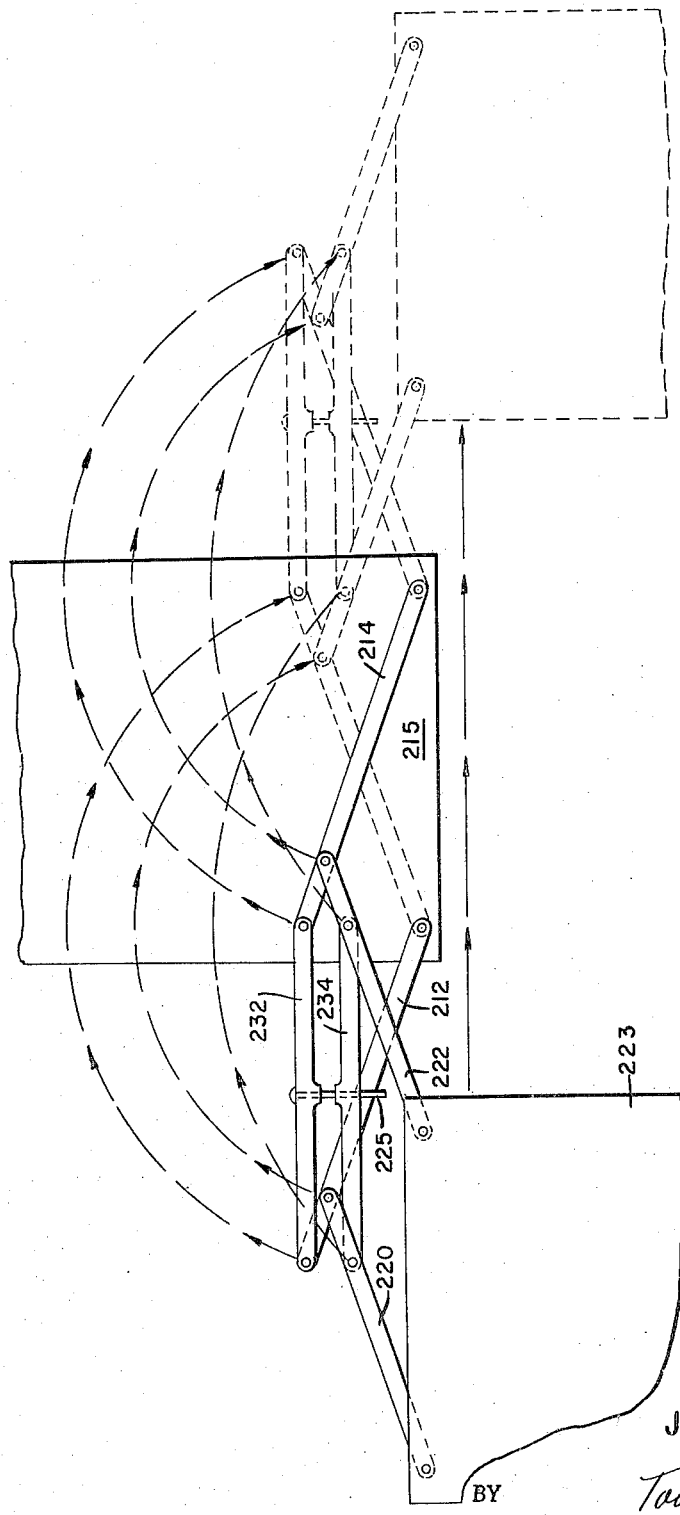
FIG. 10 is a front elevation view similar to FIG. 5, showing the embodiment of FIG. 7 in operation.

The straight line carrier device 210 utilizes as "a means to maintain spacing rods in aligned relationship" a vertically reciprocating pin 225 mounted on the spacing rod 232 which slides in an opening in the spacing rod 234. Thus, as the traveller 223 moves from left to right in FIG. 10, the pin 225 will reciprocate in the hole through the rod 234. The reciprocating pin 225 serves to maintain the spacing rods coextensive, i.e., it keeps them from sliding longitudinally with respect to one another while the rods move towards and away from one another as the traveller 223 is moved from left to right as illustrated in FIG. 10.

Another embodiment of the present invention is illustrated in FIGS. 11–14, which shows an expanding and contracting device 310. This device comprises two elements 323 and 315 which may be moved towards and away from one another in a straight line, one of which may be designated a base and the other a traveller, although, as is understood in all the devices of the present invention, both elements may travel. As in the other embodiments, a pair of parallel arms 312 and 314 are pivotally connected to the element 315 and a similar pair of parallel arms 320 and 322 are pivotally connected to the element 323. Also, as with the other embodiments, the arms 312 and 320 are connected by a pivot 328, and the arms 314 and 322 are connected by a pivot 330.

The embodiment of FIGS. 11–14 differs from the other embodiments, however, in that the arms each have an elbow extension 312', 314', 320' and 322' which ensures that the spacing rods 332 and 334 be both at the same distance from the pivots 324, 326, 316, and 318 so that the spacing rods are provided next to one another. As with the other embodiments, the spacing rods 332 and 334 serve to tie together, respectively, the arms 312–314 and the arms 320–322 to maintain such arms respectively parallel.

While all the arms may be considered to lie in a general plane extending in the direction of their length (e.g., vertical), the spacing rods 332 and 334 may be considered to lie in a plane perpendicular to the general plane of the arms (e.g., horizontal). Suitable means are provided to maintain the rods 332 and 334 in aligned relationship to each other, but in this embodiment the aligning means does not maintain the rods coextensive but instead maintains them in the same horizontal plane. Such aligning means comprises a pin 325 extending from the rod 332 towards the rod 334, which pin slides in a slot 327 as the rods 332 and 334 slide longitudinally with respect to one another during the expansion and contraction of the device 310.

The contracting and expanding unit 400 of FIG. 15 may be used in place of the unit in FIG. 1, in which case it will serve as a means to maintain the rods 32 and 34 coextensive or it may be used in the device 100 as shown in FIG. 6 for plurality use. As with the device of FIGS. 1–6, the unit 400 comprises bars 444 and 448 pivotally mounted to the spacing rod 32 at pivots 446 and 450, respectively. Similarly, bars 456 and 452 are pivotally mounted to the spacing rod 34 at the pivots 454 and 458, respectively. Bars 444 and 456 are joined at the pivot 460, and bars 448 and 452 are joined at the pivot 462.

However, to maintain the pivots 460 and 462 in the same plane as shown in FIG. 4, the device 400 utilizes a different linkage combination. Thus, tying links 466 and 466' extend from the pivot 460 and are attached to the respective bars 452 and 448 at the pivots 484 and 480, respectively. Similarly, tying links 464 and 454' extend from the pivot 462 to the pivots 482 and 486 on the bars 444 and 456, respectively.

Actually only one such tying linkage is necessary, such as the links 64–66 in FIG. 1 or the links 466–466'–464–464' in FIG. 15, but for added strength and rigidity a similar linkage on the other side is also advisable.

Figure 11:
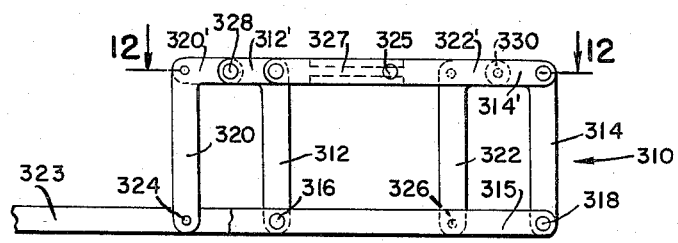
FIG. 11 is a front elevation view of another embodiment.
Figure 12:
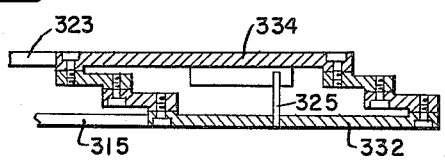
FIG. 12 is a sectional view taken along line 12—12 of FIG. 11.
Figure 13:
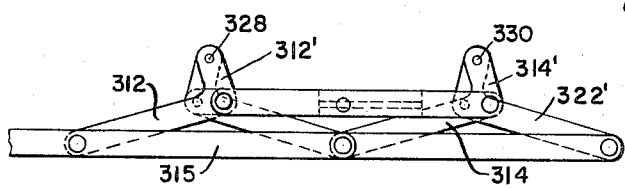
FIG. 13 is a front elevation view of the embodiment of FIG. 11 in one of its extreme positions.
Figure 14:
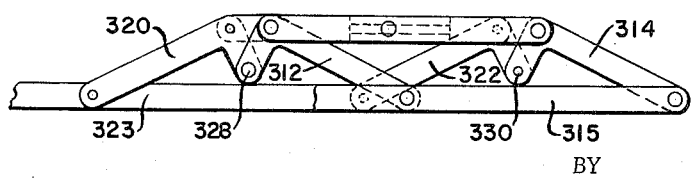
FIG. 14 is a front elevation view similar to FIG. 13, showing the other extreme position.
Figures 16, 17:
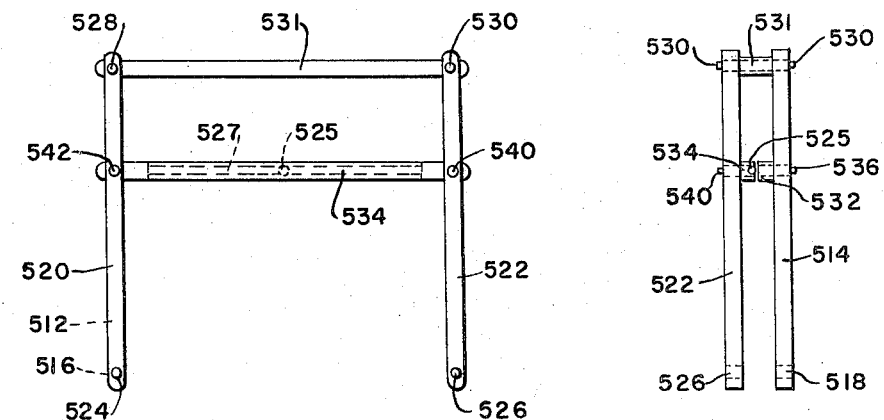
FIG. 16 is a front elevation view of another embodiment.
FIG. 17 is an end elevation view of the device of FIG. 16.

The embodiment 500 of FIGS. 16 and 17 is somewhat similar to that of FIG. 11 in that the spacing rods 532 and 534 are spaced adjacent one another in a horizontal plane and reciprocate longitudinally with the pin 525 on one bar sliding in the groove 527 in the other bar. In the carrier 500, however, the arms 520, 512, 522 and 514 are all of equal length, the arms 512 and 520 being pivoted together at 528 and the arms 522 and 514 being joined at the pivot 520 and the pivots 528 and 530 are joined by a third bar 531 of length equal to the spacing between pivots 524 and 526 as well as between pivots 516 and 518. Unlike the pin 425 in the FIG. 11 embodiment, the pin 525 moves in only one direction from one extreme position to the other. Using the concept of parallelograms, the third bar 531 acts as the parallelogram side common to both parallelograms.

The principle of the present invention resides in the connection of links which move clockwise and counterclockwise together about pivots in such a way that one cannot move unless the other one moves; and the amount and speed of movement is identical in each. This is accomplished by utilizing the straight line distance of the movement rather than the arc plane of the movement.

Thus the theory can be explained by considering two identical pendulums placed on a level plane and swinging the same horizontal distance. These pendulums will swing to the same vertical height regardless of the direction of the swing. Any device that will hold a point on one pendulum to the exact horizontal level with an identical point on the other pendulum, will suffice to limit the movement of one to the other when one is swinging clockwise and the other one is swinging counterclockwise.

The present invention involves superimposing two pivoted constructed parallelograms (e.g., 20-imaginary side-22 and 12-imaginary side-14) of identical width, whereas length may or may not be identical, one upon the other, the identical separated sides (the common imaginary side) being pivoted together (at 28 and 30) an identical distance from one side of both parallelograms to form the common side between pivots 28 and 30. As noted in FIG. 16, the common side 531 may be a physical extension. In either event the parallelograms can turn in an arc movement in relation to one another upon the common side, real or imaginary. Means are provided to hold the said arc movement in aligned relationship, in exact ratio, one to the other. By selecting points identical distances from the common side, real or imaginary, for each pivoted side of both parallelograms, and using identical directions from the common side for each parallelogram, or using directly opposite directions for each parallelogram and by linking the identical points on individual parallelograms together via pivoted rods (e.g., 32 and 34), which rods may or may not constitute a side for the parallelogram but will always sustain the parallelogram, these rods will remain in the same longitudinal plane or the same perpendicular plane thereto in relation to each other, and will remain parallel to each other and may remain coextensive, as one parallelogram is turned clockwise and the other one is turned counterclockwise, regardless of the degree of turn, since each will turn to the same degree. Therefore, if the said rods of the two parallelograms are held in an exact plane in relation to one another, either on a level plane or a plane perpendicular to their longitudinal position, depending on selection of directions from the common side for the said linkages, the degree of turn of one parallelogram will be the exact same degree of turn for the other parallelogram although turned in the opposite direction.

The primary direction of movement for the pivoted spacing rods on both parallelograms in relation to one another is maintained aligned by preventing any separation in the said two rods in the direction which is perpendicular to the primary direction. In one embodiment, when the said rods are side by side (e.g., FIG. 11 or FIG. 16), this is accomplished with a direct holding pin attached to one rod in a manner to slide in a receiving slot of the other rod as the rods reciprocate lengthwise in respect to each other. This pin permits the lengthwise separation of the rods while preventing separation in the direction perpendicular to the lengthwise plane of the rods. An aligning means in another embodiment, when the said rods are separated in a plane perpendicular to their lengthwise plane (e.g., FIG. 7), is a pin attached to one rod and adapted to reciprocate in a receiving hole or slot of the other rod. This pin permits the linkages to separate in a plane perpendicular to each other while preventing any separating in the lengthwise position of one in relation to the other. The preferred means to hold the rods in aligned relationship is the contracting and expanding unit to replace the latter pin as utilized in FIG. 1.

Devices in accordance with the present invention are adapted for a variety of uses; thus, anything that is required to travel in a straight line with respect to something else can make use of the present invention. The devices may take the places of telescoping devices, slides, bearings, tracks, "lazy-tong" devices, etc., and one practical use is described in my co-pending application, Serial No. 419,347 filed December 18, 1964.

The devices of the present invention have less friction play than a slide, are more satisfactory than rollers if the distance of travel is sufficient and, unlike rollers, the present device ties the traveller to the base and the device is not limited to a track or housing for length of movement. The device performs a true straight line expansion for its entire distance of travel. It can be mounted to two objects to be moved in a straight line with no other mounted point or support.

The swing of the device from one side to the other side gives it a triple action which greatly extends the length of movement. The straight line carrier device has a double action: i.e., the sides of parallelograms traverse to either side in relation of one to the other; the complete device swings in relation to movement of objects from one extreme of its arc movement to the other extreme, which action moves the common axis of parallelograms from one side to the other side of this arc movement, and in effect this again doubles the length of movement in relation to the original position of this unit.

One advantage of this straight line carrier device is an aberration whereas in moving an object in relation to a stationary object the straight line movement can be altered to an elliptic line of movement, due to the swing of the parallelograms, wherein the swing of the parallelograms would change the arc of a circle movement to an elongated arc. This could be caused in the installation of the device, or in construction of the device, by placing mounting pivots at a greater distance from common axis for one parallelogram than for the second parallelogram. For instance a door could be installed to contact the floor when closed and by the lift of the elliptic movement it would not drag in transit from one side to the other side.

It will be obvious to those skilled in the art that various changes may be made without departing from the spirit of the invention and, therefore, the invention is not limited to what is described in the specification but only as indicated in the appended claims.

What is claimed is:

1. A straight line carrier device, including a base and a traveller comprising a first arm pivotally mounted on said base; a second arm pivotally mounted on said base and spaced apart from said first arm; a third arm pivotally mounted on said first arm; a fourth arm pivotally mounted on said second arm in the same manner as said third arm is mounted on said first arm; said traveller being pivotally mounted on said third and fourth arms, said third and fourth arms being spaced apart from each other a distance equal to the spacing on said base of said first and second arms; a first spacing rod pivotally mounted between said first and second arms to maintain said first and second arms parallel; a second spacing rod parallel and coplanar with said first spacing rod and pivotally mounted between said third and fourth arms to maintain said third and fourth arms parallel; and means to maintain said first and second rods in aligned relationship.

2. A device in accordance with claim 1 wherein said spacing rods are disposed generally in the plane of said arms so that said rods move perpendicularly towards and away from each other as said device is expanded and contracted in a straight line; said means to maintain said rods in aligned relationship serving to maintain said spacing rods coextensive.

3. A device in accordance with claim 2 wherein said means to maintain said rods in aligned relationship comprises a pin adapted to reciprocate as said spacing rods move perpendicularly towards and away from each other.

4. A device in accordance with claim 2 wherein said means to maintain said rods in aligned relationship comprises a first bar pivotally mounted to said first spacing rod; a second bar pivotally mounted to said first spacing rod; a third bar pivotally mounted between said second spacing rod and said first bar, said first and third bars forming a "V" between said spacing rods; a fourth bar pivotally mounted between said second spacing rod and said second bar, said second and fourth bars forming a "V" between said spacing bars opposite the "V" formed by said first and third bars, and linkage means pivotally tying said "V's" together to permit the pivots forming said "V's" to move only towards and away from each other in a straight line.

5. A device in accordance with claim 4 wherein said linkage means comprises a first tying link pivotally mounted between said first and fourth bars; a second tying link pivotally mounted between said second and third bars; and a pivot tying the centers of said links.

6. A device in accordance with claim 4 wherein said linkage comprises a first tying link pivotally mounted between said second bar and the pivot forming the "V" between said first and third bars, a second tying link pivotally mounted between said fourth bar and the pivot forming the "V" between said first and third bars, a third tying link pivotally mounted between said first bar and the pivot forming the "V" between said second and fourth bars, and a fourth tying link pivotally mounted between said third bar and the pivot forming the "V" between said second and fourth bars.

7. A device in accordance with claim 1 wherein said spacing rods are disposed side-by-side in a plane perpendicular to the general plane of said arms so that said rods move lengthwise with respect to each other as said traveller moves in a straight line; and said means to maintain said rods in aligned relationship comprises a pin on one said rod and a receiving slot on the other said rod, which pin is adapted to slide within said slot as said rods move lengthwise with respect to one another.

8. A device in accordance with claim 7 wherein said arms have elbow extensions, said rods being pivoted at said extensions.

9. An expansion unit for maintaining elements in aligned relationship comprising a base; a first bar pivotally mounted to said base; a second bar pivotally mounted to said base; a third bar pivotally mounted to said first bar and forming a first "V" therewith; a fourth bar pivotally mounted to said second bar and forming a second "V" therewith facing opposite to said first "V"; a member aligned to said base pivotally mounted to said third and fourth bars; and linkage means pivotally tying said "V's" together to permit the pivots forming said "V's" to move only towards and away from each other in a straight line.

10. A device in accordance with claim 9 wherein said linkage means comprises a first tying link pivotally mounted between said first and fourth bars; a second tying link pivotally mounted between said second and third bars; and a pivot tying the centers of said links.

11. A device in accordance with claim 9 wherein said linkage comprises a first tying link pivotally mounted between said second bar and the pivot forming the "V" between said first and third bars, a second tying link pivotally mounted between said fourth bar and the pivot forming the "V" between said first and third bars, a third tying link pivotally mounted between said first bar and the pivot forming the "V" between said second and fourth bars, and a fourth tying link pivotally mounted between said third bar and the pivot forming the "V" between said second and fourth bars.

12. A straight line carrier device comprising pivotally connected side members forming two parallelograms having pivoted corners, said parallelograms being superimposed, one upon the other, with opposite sides of one said parallelogram being pivoted to the corresponding opposite sides of the said second parallelogram in a manner to form a common side to permit the said parallelograms to turn in an arc movement in relation of the one to the other about the said common side; spacing rods connecting opposite sides of each of said parallelograms, said spacing rods being parallel to said common side and spaced an equal distance from said common side to establish a straight line between the identical arc movements of the two sides on the said parallelograms, said spacing rods remaining parallel and aligned one with the other as said parallelograms move with respect to each other; wherein a fourth side of one said parallelogram comprises a movable object, wherein a fourth side of said second parallelogram comprises a base object; and means to hold the relative motion of one said parallelogram clockwise in exact ratio to the counterclockwise motion of said other parallelograms on said common side, said means holding said separation of the said two spacing rods in aligned relationship while permitting separation in the direction perpendicular to the said one direction; wherein said straight line carrier device is anchored solely by the said pivoted mountings of said opposite sides to said fourth sides, the mounting of one said parallelogram permitting said device to swing from one extremity of its arc movement in relation to the said other pivoted mounting to the other extremity of said arc movement as said objects are moved towards and away from each other, whereby the resultant arc movements of the said parallelograms translate to a straight line movement of said objects.

13. A straight line carrier device in accordance with claim 12 wherein the two said parallelograms swing in unison from the mounting pivots on objects as the said objects are moved towards and away from each other in a straight line.

14. A device in accordance with claim 12 wherein said spacing rods are disposed an identical distance from said common side in a directly opposite direction from each other, said opposite direction being perpendicular to a line through said common side so that said spacing rods move towards and away from each other in the direction perpendicular to the length of the said spacing rods as said device reciprocates.

15. A device in accordance with claim 14 wherein said means to maintain said spacing rods aligned comprises a pin on one said spacing rod adapted to reciprocate therewith in an opening in the other said spacing rod, said pin maintaining said spacing rod coextensive and permitting them to separate only perpendicular to their length as said spacing rods move towards and away from each other.

16. A device in accordance with claim 14 wherein said means to maintain said spacing rods coextensive comprises a unit consisting of two "V" shape angles with sides of said angles are pivoted together at the converging point to form a vertex, wherein the said vertexes are faced in directions opposite each other and the open ends of said sides of the said angles are overlapped one angle over the other, and wherein connecting linkages are provided to anchor the said angles to one another in a manner to hold the said vertexes in the exact center plane in relation to the open sides of their opposite angle when said angles are compressed and expanded to move said vertexes solely towards and away from each other in a straight line.

17. A device in accordance with claim 16 wherein said connecting linkages comprise means to hold said vertexes in exact center of said linkages.

18. A device in accordance with claim 12 wherein said parallelograms have perpendicular extensions to their said opposite sides in the same plane as said parallelograms which extensions provide offset pivoting about said common side and whereas said spacing rods are disposed in opposite directions from said common side and in a plane perpendicular to the plane of said parallelograms so that said rods reciprocate lengthwise with respect to each other as said device reciprocates; said aligning means comprising means to maintain said rods in said perpendicular plane.

19. A device in accordance with claim 18 wherein said means to maintain said rods coplanar in said perpendicular plane comprises a pin on one said rod and a receiving slot in the other said rod.

20. A device in accordance with claim 12 wherein said rods are disposed an identical distance from said common side in the same direction from said common side and wherein said rods reciprocate lengthwise with respect to each other as said device reciprocates; said aligning means comprising means to maintain said third sides in a plane perpendicular to the general plane of said parallelograms.

21. A device in accordance with claim 20 wherein a rod is provided to make a physical connection along said common side.

22. A device in accordance with claim 12 wherein one parallelogram is pivotally mounted at a greater distance from the common axis than the second parallelogram to cause an elliptic line of movement.

23. A device in accordance with claim 2 comprising a spring between said spacing rods.

24. A device in accordance with claim 2 comprising a spring between the pivot joining said first arm and said third arm and the pivot between said second spacing rod and said fourth arm.

25. A device in accordance with claim 4 comprising a spring between the pivot joining said first and third bars and the pivot joining said second and fourth bars.

References Cited by the Examiner
UNITED STATES PATENTS

| | | | |
|---|---|---|---|
| 428,476 | 5/1890 | Gastrell | 74—521 |
| 2,585,566 | 2/1952 | Lundstrom | 74—103 X |
| 2,597,861 | 5/1952 | Gerlach | 248—277 X |

OTHER REFERENCES

Reason et al.: Australian printed specification No. 126,603, published June 22, 1944.

CLAUDE A. LE ROY, *Primary Examiner.*

R. P. SEITTER, *Assistant Examiner.*